United States Patent
Bishop et al.

(10) Patent No.: US 9,495,830 B2
(45) Date of Patent: Nov. 15, 2016

(54) CASHLESS PLAY SYSTEM BASED ON PROPRIETARY MONETARY SYSTEMS

(71) Applicant: NAMCO USA INC., Wood Dale, IL (US)

(72) Inventors: David L. Bishop, Barrington, IL (US); Alexander N. Orban, Naperville, IL (US); John P. Kneip, Chicago, IL (US)

(73) Assignee: NAMCO USA INC.

( * ) Notice: Subject to any disclaimer, the term of this patent is extended or adjusted under 35 U.S.C. 154(b) by 135 days.

(21) Appl. No.: 13/965,075

(22) Filed: Aug. 12, 2013

(65) Prior Publication Data
US 2015/0045118 A1    Feb. 12, 2015

(51) Int. Cl.
| A63F 9/24 | (2006.01) |
| G07F 17/32 | (2006.01) |
| A63F 13/792 | (2014.01) |
| A63F 13/352 | (2014.01) |

(52) U.S. Cl.
CPC ....... *G07F 17/3244* (2013.01); *G07F 17/3227* (2013.01); *G07F 17/3239* (2013.01); *A63F 13/352* (2014.09); *A63F 13/792* (2014.09)

(58) Field of Classification Search
None
See application file for complete search history.

(56) References Cited

U.S. PATENT DOCUMENTS

| 6,636,620 B1* | 10/2003 | Hoshino | G06F 3/021 340/5.53 |
| 2004/0014513 A1* | 1/2004 | Boon | A63F 13/10 463/8 |
| 2004/0128145 A1* | 7/2004 | Sato | G06F 21/10 705/1.1 |
| 2005/0054423 A1* | 3/2005 | Wadleigh | 463/20 |
| 2006/0079315 A1* | 4/2006 | Okada | 463/25 |
| 2007/0167239 A1* | 7/2007 | O'Rourke | 463/42 |
| 2009/0253507 A1* | 10/2009 | Ishii et al. | 463/32 |
| 2010/0095290 A1* | 4/2010 | Miwa | G06F 8/65 717/170 |
| 2010/0203972 A1* | 8/2010 | Lee | A63F 13/12 463/42 |
| 2013/0040739 A1* | 2/2013 | Mahfoud | G07F 17/3209 463/42 |
| 2013/0109464 A1* | 5/2013 | Uchiyama et al. | 463/29 |
| 2014/0045589 A1* | 2/2014 | Paradise | A63F 13/00 463/29 |
| 2014/0094232 A1* | 4/2014 | Framel | H04W 4/028 463/6 |

* cited by examiner

*Primary Examiner* — Jason Yen
(74) *Attorney, Agent, or Firm* — Marshall, Gerstein & Borun LLP; Randall G. Rueth

(57) ABSTRACT

A cashless play system for arcade games at retail locations of a company utilizes a card reader to read patron account information. The card reader sends the patron account information to a game play server and receives game play authorization information based on the patron account information and patron data stored in a patron database. The card reader activates the arcade game based on the game play authorization information and causes game play data to be stored in a game play database. Further, the game play server uploads game play data to a remote server, at a geographic location other than the geographic location of the retail location, and downloads game play server updates.

14 Claims, 3 Drawing Sheets

CASHLESS PLAY SYSTEM BASED ON PROPRIETARY MONETARY SYSTEMS

TECHNICAL FIELD

The present disclosure generally relates to entertainment machines and, more particularly, to the cashless play of arcade games at a location of a retailer.

BACKGROUND

Arcade game operators prefer to install arcade games, such as video games, pinball games, redemption games, claw cranes, etc., in locations where people may be localized for long periods of time, such as hotels, restaurants, theaters, shopping centers, and other public places. In particular, operators often have agreements with retailers to install arcade games in one or more locations of the retailer.

However, maintaining a network of arcade games at multiple locations of a multi-site retailer or multiple locations of multiple retailers can present difficulties to the operator of the arcade games. In some cases, monetary systems used for arcade game payments and monetary systems used for purchasing goods and services at the retailer may differ. A customer at a retailer location can use a gift card or proprietary charge card to pay for goods and services while the same gift card or proprietary charge card may not be used for an arcade game installed at the retailer location. As such, customers may lack the cash needed to play arcade games or it is not immediately convenient to activate a game.

SUMMARY

In one embodiment, a cashless play system for an arcade game installed at a retail location of a company comprises one or more tangible, non-transitory computer readable storage devices and a game play server, located at the retail location, configured to receive, via a communication link, patron account information from a network access point. The game play server is further configured to send, via the communication link, the patron account information to a server owned by a third party, the server owned by a third party being a third party server, receive authorization information, based on the patron account information, from the third party server, send, via a communication link at the game play server, the authorization information to the network access point, and cause game play data to be stored on the one or more tangible, non-transitory computer readable storage devices. The game play data includes transaction information indicating monetary charges for activating the arcade game associated with the patron account information, and the game play data is accessible by the game play server and the third party server. Still further, the game play server is configured to upload, via a computer network, game play data to a remote server, the remote server being at a geographic location other than the retail location, and download, via the computer network, game play server updates from the remote server, the game play server updates being based on the game play data.

The cashless play system further comprises a card reader, at the arcade game, adapted to receive information indicative of a monetary account corresponding to one or more customers after reading a card corresponding to the monetary account, the information indicative of the monetary account corresponding to the one or more customers being patron account information and the card being issued to a customer for purchasing goods and services exclusively with the company, send, via a communication link at the card reader, the patron account information to the network access point, and receive, via the communication link, game play authorization information based on the patron account information from the network access point. The card reader is further adapted to activate the arcade game based on the game play authorization information being a positive activation indication, or not activate the arcade game based on the game play authorization information being a negative activation indication.

In another embodiment, a method for cashless play of an arcade game at a retail location of a company comprises receiving, at a card reader, information indicative of one or more customers by reading the information from a card, the information indicative of one or more customers being patron account information and the card being issued to the one or more customers for making purchases of goods or services exclusively with the company, sending, via a communication link at the card reader, the patron account information to a network access point, sending, via a communication link at the network access point, the patron account information to a game play server located at the retail location, and receiving game play authorization from the game play server. The game play authorization is based on the patron account information.

Further, the method includes at least one of: (i) activating the arcade game, by the card reader, based on the game play authorization information being a positive activation indication; or (ii) not activating the arcade game, by the card reader, based on the game play authorization information being a negative activation indication. Still further, the method includes causing game play data to be stored in a game play database. The game play data includes transaction information indicating monetary charges for activating the arcade game associated with the patron account information, and the game play data is accessible by the game play server and a server owned by a third party. The method also includes synchronizing, via a computer network, the game play server with a remote server at a geographic location other than the retail location. The synchronizing includes uploading the game play data to the remote server and downloading game play server updates, the game play server updates being based on the game play data.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such terms should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
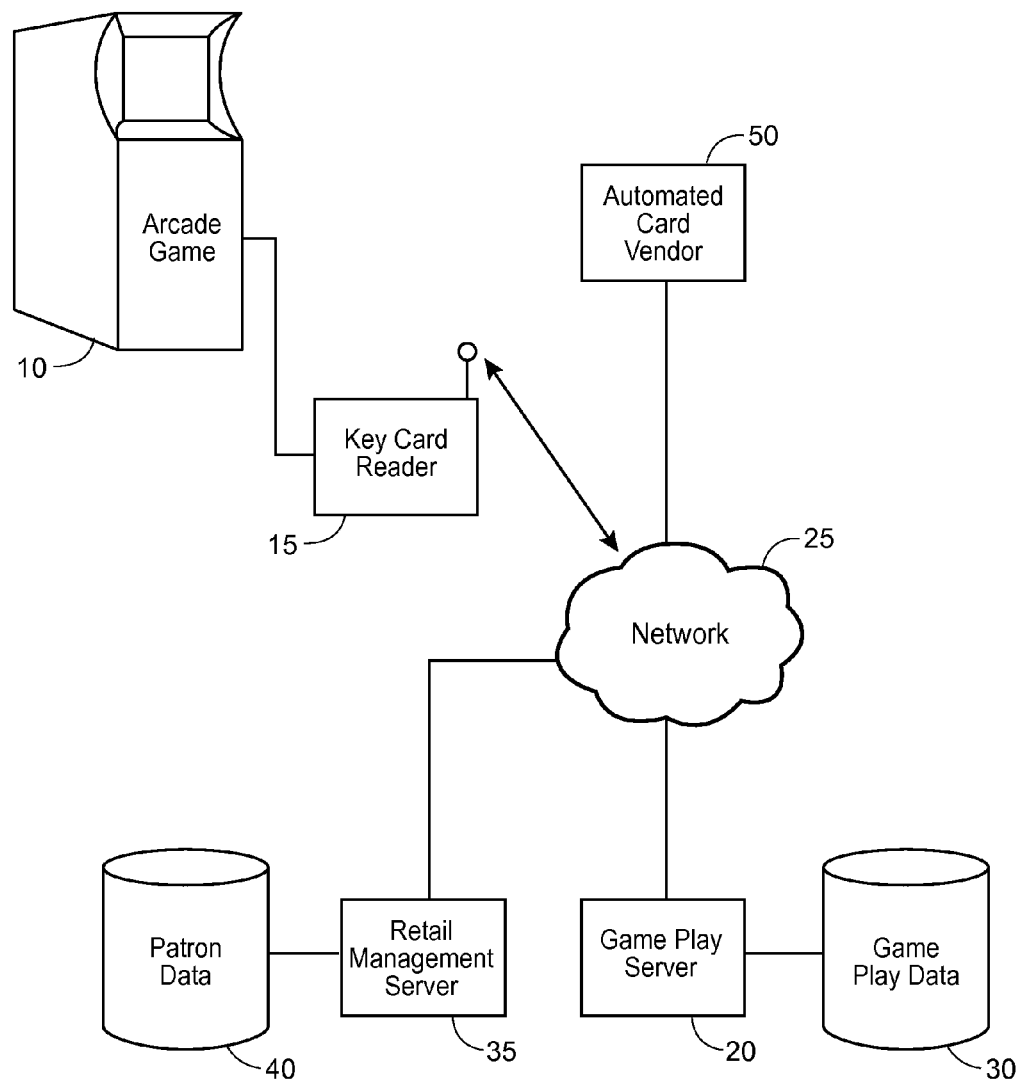
FIG. 1 illustrates an example cashless play system for an arcade game.

FIG. 1 illustrates an example cashless play system for an arcade game 10 installed at a retail location of a specific company, such as a movie theater, restaurant, etc. The arcade game 10 is communicatively coupled to a card reader 15, described in detail with reference to FIG. 2, via a wired connection such as a coaxial cable, optical fiber cable, or twisted pair cable, for example. The card reader 15 is adapted to read patron account information stored on patron cards, the patron cards being used for the purchase of goods and/or services at the retail location. For example, the card may be a gift card or proprietary charge, credit, or debit card issued by the company for exclusive use at the retail locations of the company, such as the retail location in which the arcade game 10 is installed. The cards, and the corresponding card reader 15, may be of any type known in the industry such as magnetic strip, radio frequency identification (RFID), bar code, smart card, and quick response (QR) code, for example.

The patron account information stored on the cards provides an indication of an account associated with one or more customers. For example, a customer may apply for and receive a proprietary debit card, linked to a bank account of the customer, for exclusive use at retail locations of a particular company. When a card reader, such as the card reader 15, reads the card, the generated patron account information may include an identification number or code, for example, corresponding to the customer account. Using the patron account information, the company may retrieve balances of the customer account, ages of customers, names of customers, etc.

For cashless play of the arcade game 10, a customer provides patron account information to the card reader 15 via a card, as discussed above. The card reader 15 sends the patron account information to a game play server 20 via one or more wireless interfaces (not shown), a wireless access point (not shown) and a network cloud 25. The wireless interfaces may be any interface appropriate for the purpose including, by way of example and without limitation, IEEE 802.11a/b/g/n/ac, mobile telephony, etc. Alternatively, in an embodiment, the card reader 15 sends the patron account information to a game play server 20 via one or more wired interfaces, such as coaxial cables, twisted pair wires, etc.

Upon receiving the patron account information, the game play server records an indication of the attempt to play the arcade game 10 in a game play database 30 on computer-readable storage media that can include both volatile and nonvolatile memory components. In some embodiments, the game play database 30 also includes information regarding the status of the arcade game 10 (e.g. active, broken, etc.) and game pricing information (e.g. $0.50 per game play). Correcting game play errors, or otherwise broken arcade games, is further discussed below with regard to FIG. 3.

The game play server 20 relays the patron account information to a retail management server 35 via a wired or wireless communication link. The retail management server 35 is a third party server, such as a server owned by the company operating the retail location where the arcade game 10 is installed, that uses the patron account information to authorize or deny game play for the one or more customers corresponding to the patron account information. For example, the retail management server 35 may use the patron account information to access a credit account stored in the patron database 40 and associated with the customer attempting to play the arcade game 10. Based on the balance of that credit account, the retail management server 35 may authorize or deny game play. In some embodiments, the retail management server 35 may consider multiple factors in authorizing game play, such as account balance, age of patrons, time of day, geographic location of the arcade game 10, etc.

If game play is authorized by the retail management server 35, an indication of the authorized game play is sent to the game play server 20. Upon receiving the indication of authorized game play, the game play server 20 records an indication of the authorization in the game play database 30 along with a charge associated with that game play. For example, the game play server 20 may create a record in the game play database 30 indicating that "Customer #1479725" is charged 11.50" for playing "Game #42." Also, the retail management server 35 may create a similar record in the patron database 40, in the example scenario. In some embodiments, the game play server 20 may store additional transaction details in the game play database 30, such as transaction times and part or all of the patron account information.

Further, the game play server 20 relays the game play authorization information to the card reader 15. The card reader activates the arcade game 10 upon receiving game play authorization information indicating authorized game play, and the one or more customers corresponding to the patron account information may then play the arcade game 10. Thus, the arcade game is activated without the need for the customers to carry cash. The customers need only to carry a card, where the card is already in use for purchasing goods and services at a retail location, for example.

If game play is denied by the retail management server 35, an indication of the denial of game play is sent to the game play server 20. Upon receiving the indication of denial, the game play server 20 records an indication of the denial in the game play database 30. Further, the game play server 20 relays the game play denial information to the card reader 15, and the card reader may provide an indication of the game play denial to the customer(s) attempting to initiate game play. For example, the card reader may provide an indication of insufficient funds in the account associated with the patron account information.

In some embodiments, a loyalty or redemption program may be integrated with the cashless play system, such as the cashless play system illustrated in FIG. 1. For example, a company operating a retail location in which an arcade game is installed may utilize a loyalty program to encourage a customer to purchase products or services. A movie theater may, for example, awards a customer one-hundred points for purchasing a movie ticket, fifty points for buying popcorn, etc. When the customer receives a specific number of points, the customer may be rewarded with a prize or coupon for further service (e.g. a free drink or a buy one drink get one free coupon), for example.

Because the cashless play system of the current disclosure, such as the cashless play system illustrated in FIG. 1, is integrated with the proprietary card system of a certain company, arcade games may be integrated into any loyalty or redemption program offered by the company. For example, customers may receive a specific number of points for playing an arcade game, and these points may be added to any existing loyalty points received for purchasing other services and products at the retail location. The points may be added to the account of a customer when the patron account information is sent from a card reader at the arcade game to a retail management server, such as the retail management server 35, via a game play server, such as the game play server 20.

Further, the techniques of the present disclosure are utilized, in some embodiments, to provide cashless activation of devices other than arcade games. For example, card readers at vending machines, access control devices (e.g. turnstiles controlling entry to certain areas), motion-based simulator rides, etc. may activate the respective devices based on authorization information from a game play server, such as game play server 20. Such an integrated system allows a retail location and arcade game operator to more easily track and record transactions, corresponding to many different amusement devices, via a centralized cashless activation/game play system.

In an embodiment, one or more arcade games, such as arcade game 10, installed at a retail location are redemption games. Redemption games are a type of arcade game that rewards players of the game proportionally to the scores of the players in the game, where the rewards are often in the form of tickets redeemable for prizes (e.g. fifty tickets may be redeemed for a stuffed animal). Similar to the points system discussed above, a redemption game integrated in the cashless play system may reward the player with points proportional to the score of the player in the game. These points may be redeemed for further game play or for the purchase of other services or products at the retail location. To facilitate such redemption games, the card reader, such as the card reader 15, may send an indication of player scores to a game play server, such as the game play server 35, in addition to patron account information.

In some implementations, the cashless play system may include an automated card vendor 50 to sell proprietary cards associated with the company operating the retail location. For example, the automated card vendor 50 may be a machine that receives cash, credit, debit, or other payments and dispenses branded gift cards for exclusive use at retail locations operated by the company. A customer may purchase a gift card at the automated card vendor 50 and proceed to use the gift card for game play of the arcade game 10 and/or for the purchase of goods and services at the retail location, in an example scenario. In one implementation, the automated card vendor 50 may receive payment for a gift card, dispense the gift card, and send, via network 25, an activation message to the retail management server 35 to activate the gift card.

Figure 2:
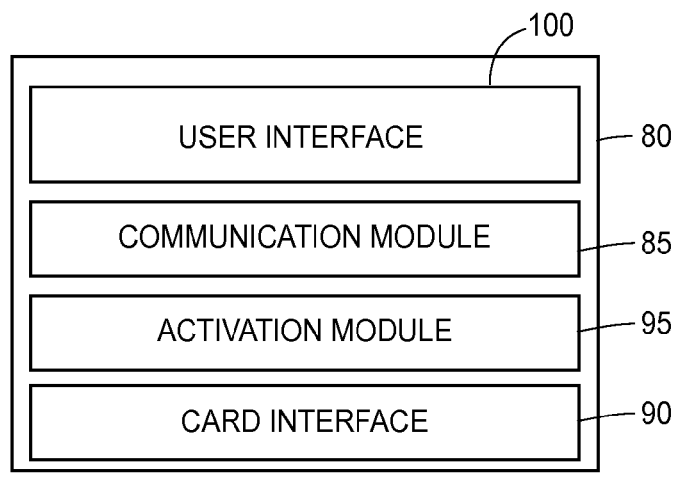
FIG. 2 illustrates an example proprietary card reader than can read patron account information and activate an arcade game.

FIG. 2 illustrates an example card reader 80 that can read patron account information and activate an arcade game. The card reader 80 includes a communication module 85, where the communication module 85 provides communication to an arcade game, such as the arcade game 10, and a game play server, such as the game play server 20, as discussed above.

The card reader 80 also includes a card interface 90. The card interface 90 may be any appropriate card interface corresponding to the type of cards used by customers of a retailer. For example, if customers of a retailer are issued RFID cards, the card interface 90 may include appropriate radio signal sensors and processing routines to read the RFID card, or if customers of a retailer are issued magnetic strip cards, the card interface 90 may include a slot into which cards may be inserted or swiped.

The card reader 80 transfers patron account information read from patron cards to the communication module 85, and, in turn, the communication module 85 sends the patron account information to a game play server, such as the game play server 20. As discussed above, the game play server, may, after communicating with a retail management server, send game play authorization information back to the card reader 80.

Upon receiving game play authorization information indicating authorized game play, the activation module 95 generates an activation signal for the arcade game. The activation signal is sent, via the communication module 85, to the arcade game to activate the arcade game. The activation signal may be a digital or analog signal. In some embodiments, the activation signal includes game specific information, such as allotted length of time for game play, for example, which may be changeable based on the patron, game location, etc. If the game play authorization information includes an indication of denied game play, the card reader 80 may forward this indication of denial to the user via one or more lights, one or more sounds, or via a user interface, discussed below.

The example card reader 80 also includes a user interface 100. The user interface may include a touchscreen, LED display, keyboard, one or more buttons or toggles, and/or any other appropriate devices commonly used in the industry. Upon receiving authorization information from a game play server, the user interface 100 may display an indication of game play authorization to the customer, such that the customer is aware of the game play authorization. Further, the user interface 100 may display other relevant information such as charges associated with the game play, length of time allotted for the game play (e.g. in the form of a timer), or loyalty points earned for the game play, for example.

In some embodiments, customers manually enter patron account information via the user interface 100. Some companies may issue customers a personal identification number (PIN). The customers may enter the PIN at the card reader, via a keyboard, for example, to provide patron account information, as opposed to using a card. Alternatively, customers may manually enter specific identification information, such as name, age, address, etc., in cases where a card has been lost or cards are not issued, for example.

Therefore, an arcade game, such as the arcade game 10, installed at a retail location may be activated with a cashless pay system based on a proprietary monetary system (e.g. company exclusive gift cards, charge/debit cards, etc.). This cashless play system provides an easy and intuitive customer experience and allows the integration of loyalty and redemption programs. However, it is additionally desirable for the operator of a network of arcade games to access transaction information, game play statistics, game errors, etc. and update pricing information, arcade game operating systems, etc. from a remote location.

Figure 3:
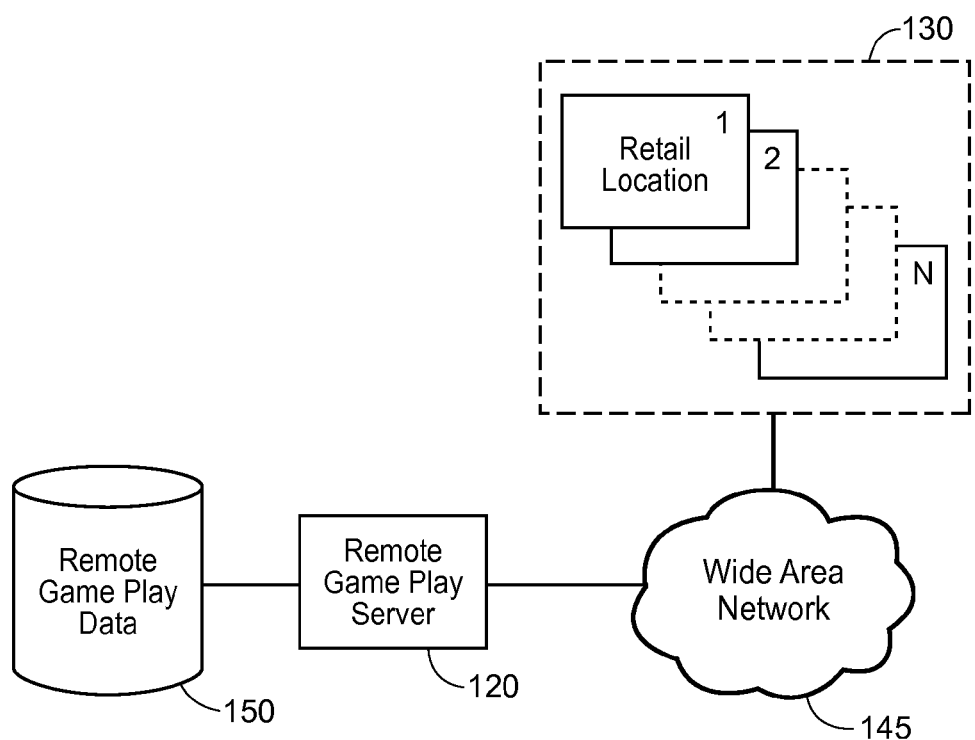
FIG. 3 illustrates an example system in which a game play server and remote server may be synchronized.

FIG. 3 illustrates an example system in which game play data may be uploaded to a remote game play server 120 and game play server updates may be downloaded to a game play server, such as the game play server 20. One or more retail locations 130 operated by a company are communicatively coupled to a wide area network 145. The wide area network may be the internet, for example. In some embodiments, the one or more retail locations 130 may maintain a constant connection to the wide area network 145, and in other embodiments, the one or more retail locations 130 may only connect to the wide area network at specific times (e.g. once per hour or once per day).

A game play server, such as the game play server 20, disposed at one of the retail locations 130 manages the game play of one or more arcade games, such as the arcade game 10. Over time, the game play server accumulates game play data in a game play database, such as the game play database 30, and periodically uploads the game play data to the remote game play server 120, via the connection to the wide area network 145. In some embodiments, the game play server 20 uploads only relevant portions of the game play data in the game play database. In another implementation, the game play data may include error messages, game play statistics, and player scores from the arcade game.

Upon receiving the game play data from the game play server at one of the retail locations 130, the remote game play server 120 records the game play data in a remote game play database on computer-readable storage media that can include both volatile and nonvolatile memory components. In this way, the game play data has mirrored copies on a game play database at the retail location (e.g. the game play database 30) and a remote game play database 150. If the game play database at the retail location or corresponding server fails, the game play data is safely mirrored in the remote game play database 150 and transaction information is not permanently lost. When the game play database at the retail location or server is restored, the game play data may be restored, via download from the remote game play server 120. Further, the mirrored copies of game play data, on a game play server, retail management server, and remote server, may be compared in an audit process to verify data indicating monetary charges for game play.

In addition to storing the game play data, the remote game play server 120 develops game play server updates for the game play server at the retail location based on the uploaded game play data. For example, if only a small number of people are playing certain arcade games, the pricing for those arcade games may be reduced to encourage more frequent game play, and these pricing changes may be implemented in the form of game play server updates sent from the remote game play server 120 to the game play server at the retail location. In some embodiments, game play server updates may include pricing changes based on geographic locations of arcade games. For example, the pricing of arcade game play may differ between a game at a retail location in New York City, N.Y. and a game at a retail location in Indianapolis, Ind.

Further, if error messages are uploaded from a game play server to the remote game play server 120, the remote game play server 120 may forward an indication of the error messages to the operator of the arcade games. For example, the remote game play server may cause an email or text message alert to be sent to the operator of the arcade game notifying the operator of faulty machines. By forwarding an indication of errors on arcade games, the operator may arrange to have replacement parts, appropriate technicians, etc., ready for servicing the arcade game in a timely manner.

Figure 4:
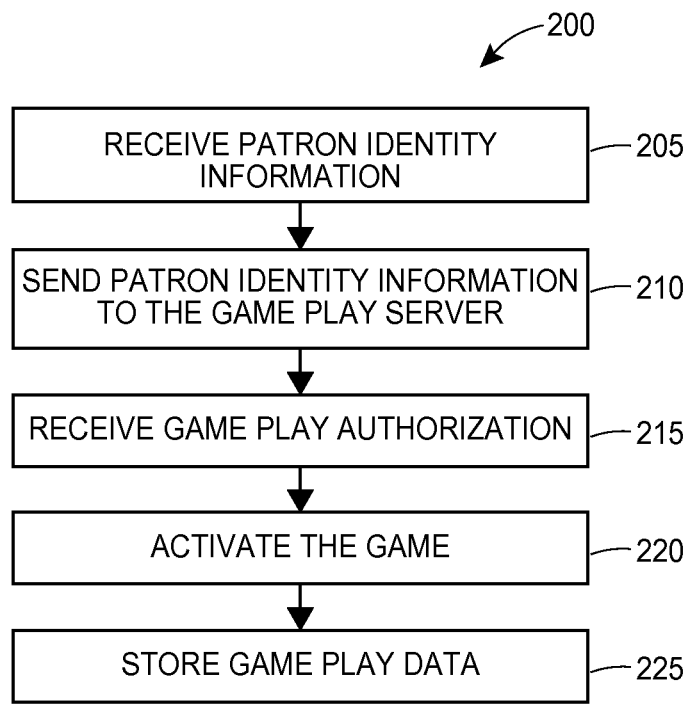
FIG. 4 is a flow chart of an example method for cashless play of an arcade game.

FIG. 4 is a flow chart of an example method 200 for cashless play of an arcade game installed at a retail location. The example method 200 may be implemented in the cashless play system illustrated in FIG. 1, for example.

The method 200 may begin when patron account information is received via a card reader, such as the card reader 15 (block 205). The patron account information may include information indicative of one or more customers of a company operating the retail location. In some embodiments, the patron account information corresponds to one or more customers sharing a single card, such as a family. In other embodiments, the patron account information corresponds to a single customer.

The patron account information is sent, via one or more wired or wireless interfaces at the card reader, to a game play server (block 210). In some embodiments, a timestamp is sent with the patron account information to provide an indication of the time at which the patron attempts to play the arcade game. The timestamp may be stored with corresponding charges associated with the play of the arcade game. The game play server forwards the patron account information to one or more retail management servers, such as the retail management server 35, for game play authorization based on the patron account information. If the game play server receives authorization information from the one or more retail management servers, the game play server forwards the authorization information to the card reader.

The card reader then receives authorization information from the game play server (block 215). The authorization information may include an authorization of game play for a fixed period of time (e.g. five minutes) or for a standard turn as defined by the arcade game settings (e.g. one chance to grab a prize with a claw), for example.

Next, the card reader activates the arcade game based on the authorization information (block 220). The activation of the arcade game may include an analog or digital signal transmitted from the card reader to the arcade game. In some embodiments, the card reader provides an indication of game play authorization to the customer via a user interface at the card reader. The indication of game play authorization may include an indication that the game is ready to be played along with a price that has been charged to the account of the customer, for example. In some embodiments, the card reader user interface may include a button that is activated by the authorization information, where the customer selects the button to initiate game play.

Game play data associated with the patron account information is stored in a game play database, such as the game play database 30 (block 225). The stored game play data includes at least a charge associated with the game play. In some embodiments, the game play data also includes all or part of the patron account information. In some other embodiments, the game play data further includes game play statistics, such as length of game play, player scores, arcade game errors, etc. The game play statistics and patron account information may be integrated into a loyalty/redemption program or used by the arcade game operator for management purposes, for example.

Figure 5:
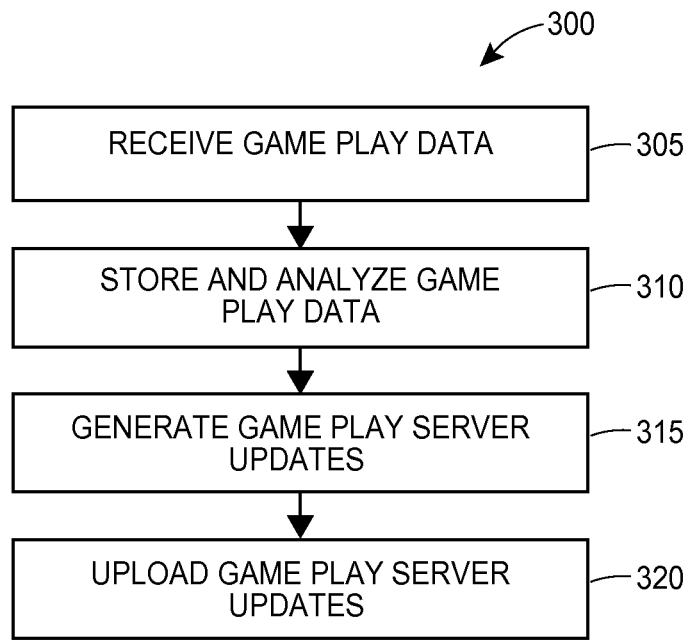
FIG. 5 is a flow chart of an example method for synchronizing a game play server at a retail location and a remote game play server.

FIG. 5 is a flow diagram of an example method 300 for synchronizing a game play server at a retail location and a remote game play server. The method may be implemented in the system illustrated in FIG. 3, for example.

A remote game play server, located in a geographic location other than the retail location, receives game play data from a game play server at the retail location (block 305). The game play data is transmitted via a computer network, or other appropriate communicative connection. In some embodiments, the remote game play server may receive game play data from a network of game play servers located at multiple retail locations with one or more arcade games installed at the respective retail locations.

Next, the remote game play server stores the game play data in a remote game play database also at a location other than the retail location (block 310). At block 315, the remote game play server develops game play server updates for the game play servers at the one or more retail locations. In some embodiments, the game play server updates include pricing update information based on the uploaded game play data. For example, the remote game play server may analyze the game play frequency or daily profits from an arcade game at the one or more retail locations and determine, based on the game play frequency and profits, an appropriate change in pricing for that arcade game. The change in pricing may be reflected in the game play server updates. In another embodiment, the game play server updates include updates to an arcade game operating system. A glitch in the operating system of certain video arcade games may be known, via error messages from arcade games at a retailer location or otherwise, and the remote game play server may develop game play server updates that include appropriate fixes to the game operating system, for example.

Game play server updates are then sent from the remote game play server to the game play server at the retail location via a wide area network, or other appropriate communication link (block 320). In some embodiments, the remote game play server uploads multiple updates, such as a pricing update, a game error update, etc., concurrently or at separate times.

We claim:

1. A game play system comprising:
an arcade game machine installed at a retail location of a company and integrated into a loyalty program offered by the company;
a card reader communicatively connected to the arcade game machine, the card reader comprising:
a user interface configured to read patron account information associated with a patron attempting to play the arcade game machine, the patron account information indicating a monetary account of the patron having associated monetary funds associated with the loyalty program, and the monetary account being used by the patron for purchasing goods and services exclusively with the company, and
a communication module configured to:
receive the patron account information from the user interface, and
send, via a communication link, the patron account information to a game play server located at the retail location, the game play server connected to the communication module via a network connection;
the game play server configured to:
receive, from the communication module of the card reader via the communication link, the patron account information, and
send, via an additional network connection separate from the network connection, the patron account information to a remote server located in a geographic location other than the retail location; and the remote server configured to:
determine, based on the patron account information, that the patron is authorized to play the arcade game, and
in response to determining that the patron is authorized to play the arcade game, send authorization information to the game play server via the additional network connection, the authorization information indicating that the patron is authorized to play the arcade game;
wherein the game play server is further configured to:
receive the authorization information from the remote server via the additional network connection, and
send, via the communication link, the authorization information to the communication module of the card reader;
wherein the card reader further comprises an activation module configured to:
generate an activation signal based on the authorization information, and
send, via the communication module, the activation signal to the arcade game machine to activate the arcade game machine based on the authorization information to enable the patron to select to initiate game play;
wherein the patron earns loyalty points for the loyalty program from playing the arcade game machine, and wherein the loyalty points are reflected in the patron account information sent from the card reader to the remote server via the game play server.

2. The system of claim 1, wherein the game play server is further configured to:
receive game play data associated with the patron account information, and
store the game play data on the at least one tangible, non-transitory computer readable storage device.

3. The system of claim 2, wherein the game play server is further configured to:
upload, via the additional network connection, the game play data to the remote server, wherein the remote server is configured to store the game play data in a remote game play database.

4. The system of claim 2, wherein to receive the game play data, the game play server is configured to:
receive at least one of: information indicative of a charge to play the arcade game machine, statistics associated with the arcade game machine, and loyalty point information associated with the patron.

5. The system of claim 1, wherein the game play server is further configured to:
receive, from the remote server via the additional network connection, an update to the game play server, and
implement the update to the game play server.

6. The system of claim 5, wherein to implement the update to the game play server, the game play server is configured to:
update a pricing of the arcade game machine.

7. The system of claim 5, wherein to implement the update to the game play server, the game play server is configured to:
cause the arcade game machine to update an operating system.

8. A computer-implemented method of enabling play of an arcade game machine installed at a retail location of a company and integrated into a loyalty program offered by the company, the method comprising:
reading, by a user interface of a card reader communicatively connected to the arcade game machine, patron account information associated with a patron attempting to play the arcade game machine, the patron account information indicating a monetary account of the patron having associated monetary funds associated with the loyalty program, and the monetary account being used by the patron for purchasing goods and services exclusively with the company;

sending, by a communication module of the card reader via a communication link, the patron account information to a game play server located at the retail location, the game play server connected to the communication module via a network connection;

receiving, by the game play server, the patron account information;

sending, by the game play server via an additional network connection separate from the network connection, the patron account information to a remote server located in a geographic region other than the retail location;

determining, by the remote server based on the patron account information, that the patron is authorized to play the arcade game;

in response to determining that the patron is authorized to play the arcade game, sending authorization information to the game play server via the additional network connection, the authorization information indicating that the patron is authorized to play the arcade game;

receiving, by the game play server from the remote server via the additional network connection;

sending, by the game play server via the communication link, the authorization information to the communication module of the card reader;

generating, by an activation module of the card reader, an activation signal based on the authorization information; and sending, by the communication module of the card reader, the activation signal to the arcade game machine to activate the arcade game machine based on the authorization information to enable the patron to select to initiate game play, wherein the patron earns loyalty points from playing the arcade game machine, and wherein the loyalty points are reflected in the patron account information sent from the card reader to the remote server via the game play server.

9. The computer-implemented method of claim 8, further comprising:

receiving, by the game play server, game play data associated with the patron account information; and storing the game play data on a database.

10. The computer-implemented method of claim 9, further comprising:

uploading, by the game play server via the additional network connection, the game play data to the remote server, wherein the remote server is configured to store the game play data in a remote game play database.

11. The computer-implemented method of claim 9, wherein receiving the game play data comprises:

receiving at least one of: information indicative of a charge to play the arcade game machine, statistics associated with the arcade game machine, and loyalty point information associated with the patron.

12. The computer-implemented method of claim 8, further comprising:

receiving, by the game play server from the remote server via the additional network connection, an update to the game play server; and implementing, by the game play server, the update to the game play server.

13. The computer-implemented method of claim 12, wherein implementing the update to the game play server comprises:

update a pricing of the arcade game machine.

14. The computer-implemented method of claim 12, wherein implementing the update to the game play server comprises:

causing the arcade game machine to update an operating system.

* * * * *